United States Patent [19]
Nakamaki et al.

[11] Patent Number: 5,585,065
[45] Date of Patent: Dec. 17, 1996

[54] BIAXIALLY-STRETCH-BLOW-MOLDED CONTAINER HAVING EXCELLENT HEAT RESISTANCE AND METHOD OF PRODUCING THE SAME

[75] Inventors: Setsuko Nakamaki; Yoshitsugu Maruhashi; Nobuyuki Kato; Kenji Matsuno, all of Yokohama; Hideo Kurashima, Yokosuka; Hiroo Ikegami, Sagamihara; Kimio Takeuchi, Kawasaki, all of Japan

[73] Assignee: Toyo Seikan Kaisha, Ltd., Tokyo, Japan

[21] Appl. No.: 442,401

[22] Filed: May 16, 1995

[30] Foreign Application Priority Data

May 16, 1994 [JP] Japan ................................. 6-100365

[51] Int. Cl.$^6$ ........................................... B29C 49/18
[52] U.S. Cl. ........................ 264/521; 264/530; 264/903; 264/906; 425/526
[58] Field of Search .................................. 264/521, 530, 264/903, 906; 425/526

[56] References Cited

U.S. PATENT DOCUMENTS

| | | | |
|---|---|---|---|
| 4,035,455 | 7/1977 | Rosenkranz et al. | 264/521 |
| 4,496,517 | 1/1985 | Kinoshita et al. | 264/521 |
| 5,261,545 | 11/1993 | Ota et al. | 264/521 |
| 5,308,233 | 5/1994 | Denis et al. | 264/906 |
| 5,378,421 | 1/1995 | Salame | 264/906 |
| 5,389,332 | 2/1995 | Amari et al. | 264/530 |

*Primary Examiner*—Catherine Timm
*Attorney, Agent, or Firm*—Sughrue, Mion, Zinn, Macpeak & Seas

[57] ABSTRACT

A biaxially-stretch-blow-molded container and a method of producing the same. Redraw ratio at the bottom portion is small in the secondary blow molding without employing a complex heating system but in which a secondary article obtained by subjecting a preform article to the primary blow molding is preferentially shrunk at its bottom portion, and a tertiary article or a quaternally article before being subjected to the secondary blow molding is obtained having a bottom of a flat shape or in which the central portion is recessed inwardly of the container and the periphery thereof is flattened. The bottle obtained by this method has a thickness and crystallinity in the bottom portion which are nearly the same as those of the center of the barrel and are highly oriented. The heat-resistant bottle exhibits excellent strength in the bottom portion and symmetrical panel-sinking stability in the vacuum pressure.

4 Claims, 11 Drawing Sheets

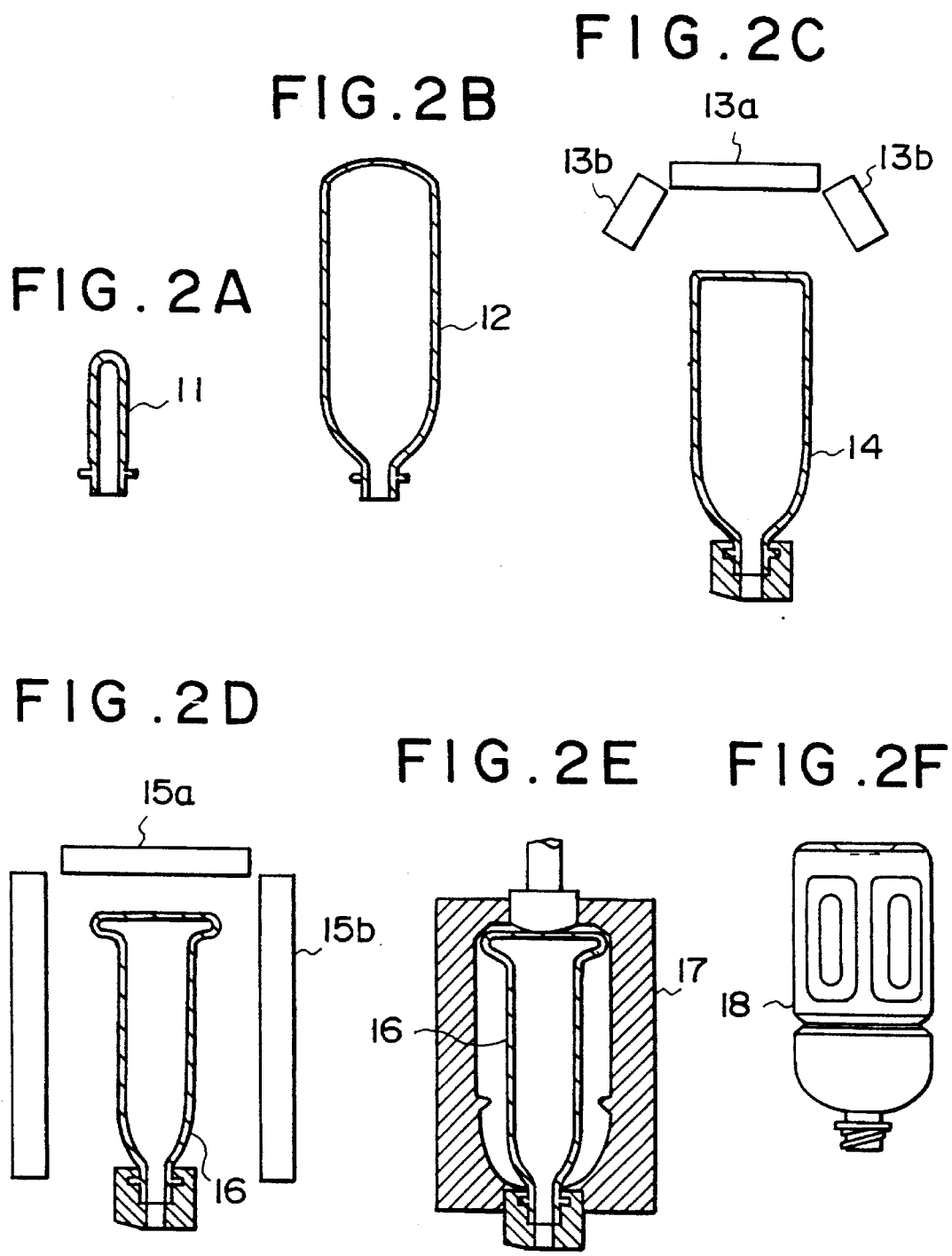

BIAXIALLY-STRETCH-BLOW-MOLDED CONTAINER HAVING EXCELLENT HEAT RESISTANCE AND METHOD OF PRODUCING THE SAME

BACKGROUND OF THE INVENTION

(1) Field of the Invention

The present invention relates to a biaxially-stretch-blow-molded container and to a method of producing the same. More specifically, the invention relates to a heat-resistant polyester bottle of the one-piece type having excellent strength in the bottom portion, heat resistance, symmetrical panel-sinking stability in the vacuum pressure and self-standing stability and to a method of producing the same.

(2) Description of the Prior Art

Biaxially-stretch-blow-molded containers of a thermoplastic polyester such as polyethylene terephthalate (PET) have excellent transparency and luster on the surface, as well as excellent shock resistance, rigidity and gas barrier property that are required for the bottles, and have been used as containers, i.e., bottles for containing a variety kinds of liquids.

A hot filling method has been employed for bottling or packaging the contents maintaining enhanced preservability. Therefore, the containers must have heat resistance to withstand high-temperature liquids that are filled therein or the heat treatment that is carried out to sterilize the contents.

Heat-resistant containers are usually produced by a single-stage blow-molding method in which the blow-molded products and molded products are heated and crystallized, i.e., heat-set, using a single metal mold. With this single-stage blow-molding method, it is difficult to heat-set the recessed bottom portions of ordinary molded articles. To guarantee heat resistance, the recessed bottom portion must have an increased thickness and a complex shape. Accordingly, the weight of the bottom portion is subject to increase.

There has also been known a two-stage blow-molding method comprising a step for primarily blow-molding a preform article using a metal mold, and a step for finally molding the article by subjecting the article to the secondary blow-molding using a metal mold after the article is heat-shrunk via a so-called heat-set step through which the article is heated, shrunk and crystallized in an oven or the like.

In the two-stage blow-molding method, the article is drawn through the step of primary blow-molding to a sufficient degree at a drawing ratio of 2 to 6 times, and the thus drawn secondarily article is sufficiently shrunk by about 60 to 90% through the heat-set step, in order to improve rigidity of the bottle and to impart heat resistance based upon the intermediate heating. Therefore, the two-stage blow-molding method is suited for producing heat resistant containers.

Employment of the two-stage blow-molding method has been disclosed in, for example, Japanese Laid-Open Patent Publication No. 205124/1991 according to which a secondary article having a semi-spherical bottom portion is formed by the primary blow molding, the article is then heated in an oven, and the article is subjected to the secondary blow-molding to obtain a final article having a bottom of which the central portion is recessed inwardly of the container.

According to Japanese Laid-Open Patent Publication No. 189224/1988, furthermore, a secondary article is formed having a semi-spherical bottom formed by the primary blow molding, the bottom is then inverted to form a tertiary article having the bottom of which the central portion is recessed inwardly of the container, the tertiary article as a whole is heated relatively uniformly and is shrunk and, then, the article is subjected to the secondary blow molding to obtain a finally molded article.

According to the conventional two-stage blow-molding method, however, if some part is drawn at a large ratio in the final secondary blow molding step, then, the thickness of that part is-locally decreased to lose the strength or the degree of crystallization is decreased making it difficult to obtain heat resistance.

That is according to the former prior art, the drawing ratio increases at the bottom corner portion at the time when the secondary article having a semi-spheric al bottom portion is subjected to the secondary blowing to obtain a final product having the bottom portion that is inwardly recessed. Therefore, the thickness of the corner portion decreases and the degree of crystallization decreases resulting in a decrease in the strength and heat resistance at that portion.

According to the latter prior art, a semi-spherical bottom shape is obtained by the primary blow-molding and is inverted to obtain a secondary article having the bottom which is inwardly recessed. At this moment, the whole secondary article is heated relatively uniformly so that the height thereof is shrunk to be smaller than the size of the metal mold for secondary blow molding. In this case, however, the diameter of the barrel is extremely shrunk and when the heat-molded article having a small barrel diameter is subjected to the secondary blowing, the drawing ratio increases at the bottom corner portion to lose heat resistance and strength.

Moreover, when the heat-resistant container having a thick bottom portion of a recessed shape is obtained by the two-stage blow-molding method, the bottom of the secondary article formed by the primary blow molding has a thick recessed shape like that of the final product. When the bottom portion is heated like the barrel portion, the temperature rises slowly in the thick portion having a large heat capacity and portions other than thick portions are particularly heated. When the thus heated secondary article is subjected to the secondary blow molding, only those thin portions heated at a high temperature are drawn. In particular, the thickness of the bottom corner portion is extremely reduced, which is not desirable. Even when it is attempted to selectively heat thick portions of the bottom, the thick portions that are drawn at a small ratio in the primary blow molding are whitened. Usually, therefore, a complex heating system has been employed according to which the whole bottom portion of the secondary article is maintained at a moldable temperature without substantially causing it to shrink, and the barrel portion is chiefly heated, shrunk and crystallized.

When the thickness of the bottom portion is increased as described above, there arise problems in regard to that a complex system is required for heat-treating the secondary article and that the weight increases accompanying an increase in the thickness of the bottom portion. It therefore becomes necessary to solve such problems.

In order to prevent deformation of the bottle caused by the vacuum pressure after the heat-resistant bottle is filled with hot content, furthermore, a panel-rib structure has been widely employed in the barrel portion of the containers. In the container forming such a panel-rib structure in the barrel portion, the panel portion undergoes a paneling deformation inwardly by vacuum pressure. When the bottle is filled with hot content, however, the panel swells outwardly. Once the panel swells outwardly at the time of filling the content, the panel then loses its function to undergo paneling deformation inwardly. Therefore, the panel at the barrel portion is sometimes deformed asymmetrically.

According to the above-mentioned prior art, the bottle is greatly oriented on the inner side. Moreover, since use is made of a metal mold of a high temperature, the degree of heat set (degree of orientation and crystallization) increases on the outside of the bottle. When the bottle is filled with hot content, therefore, the panel portion swells out under certain circumstances.

SUMMARY OF THE INVENTION

The object of the present invention therefore is to provide a method of producing a biaxially-stretch-blow-molded container relying upon the two-stage blow-molding by heat-shrinking a secondary article drawn by the primary blow molding into a more desirable form and then subjecting it to the secondary blow molding, without employing complex heating system.

Another object of the present invention is to provide a one-piece polyester bottle having excellent mechanical strength it the bottom portion, heat resistance, symmetrical pannel-sinking stability in the vacuum pressure and self-standing stability in combination, the one-piece polyester bottle capable of being filled with hot content, and a method of producing the same.

According to a first embodiment of the present invention, there is provided a method of producing a biaxially-stretch-blow-molded container by blow-molding a cylindrical preform article with bottom that is heated at a drawing temperature, comprising:

- a step for subjecting the preform article to the primary blow molding to obtain a biaxially drawn secondary article having a domed bottom portion without substantially containing undrawn portions;
- a step for heating the domed bottom portion of the secondary article to preferentially shrink the bottom portion in order to obtain a tertiary article having a flat bottom portion;
- a step for heating the tertiary article inclusive of the bottom portion and the barrel portion thereof in order to obtain a quaternary article of which the barrel portion is chiefly shrunk; and
- a step for subjecting the quaternary article that is heated to the secondary blow molding to obtain a final container.

According to a second embodiment of the present invention, there is provided a method of producing a biaxially-stretch-blow-molded container by blow-molding a cylindrical preform article with bottom that is heated at a drawing temperature, comprising:

- a step for subjecting the preform article to the primary blow molding to obtain a biaxially drawn secondary article having a domed bottom portion with an undrawn thick portion at the center of the bottom, the thick portion being slightly recessed inwardly of the container from the lowest portion of the bottom;
- a step for heating the domed bottom portion of the secondary article to increase the degree of recess of the thick portion by preferentially shrinking the bottom portion in order to obtain a tertiary article having a bottom portion where the periphery of the thick portion is flattened;
- a step for heating the tertiary article inclusive of the bottom portion and the barrel portion thereof in order to obtain a quaternary article of which the barrel portion is chiefly shrunk; and
- a step for subjecting the quaternary article that is heated to the secondary blow molding to obtain a final container.

According to the present invention, furthermore, there is provided a one-piece type heat resistant polyester bottle having excellent strength in the bottom portion, heat resistance, symmetrical panel-sinking stability in the vacuum pressure and self-standing stability obtained by stretch-blow-molding a thermoplastic polyester and having a neck portion, a barrel portion which is drawn and is heat-set and a bottom portion with a recessed central portion, the barrel portion thereof being provided with a panel-rib structure for symmetrical panel-sinking stability in the vacuum pressure, wherein the bottom portion includes a bottom center portion having a thick portion at the center which is inwardly recessed in the axial direction of the container and a peripheral grounding portion which downwardly extends in the axial direction beyond the bottom center portion, the portions excluding neck portion, part of the barrel portion continuous to the neck portion and thick portion at the center of the bottom portion, have a thickness which is drawn to not larger than 0.6 mm and are molecularly oriented to have birefringence in (the circumferential direction—the thickness direction) of not smaller than 0.070 and are further heat-set to have a crystallinity of not smaller than 35%, and the inner side and the outer side of the barrel panel portion have nearly the same crystallinity, or the inner side has a crystallinity which is larger than that of the outer side.

BRIEF DESCRIPTION OF THE DRAWINGS

FIGS. 2A–2F are diagrams illustrating a step of molding according to a first embodiment of the present invention.

DETAILED DESCRIPTION OF THE INVENTION

Figure 1:
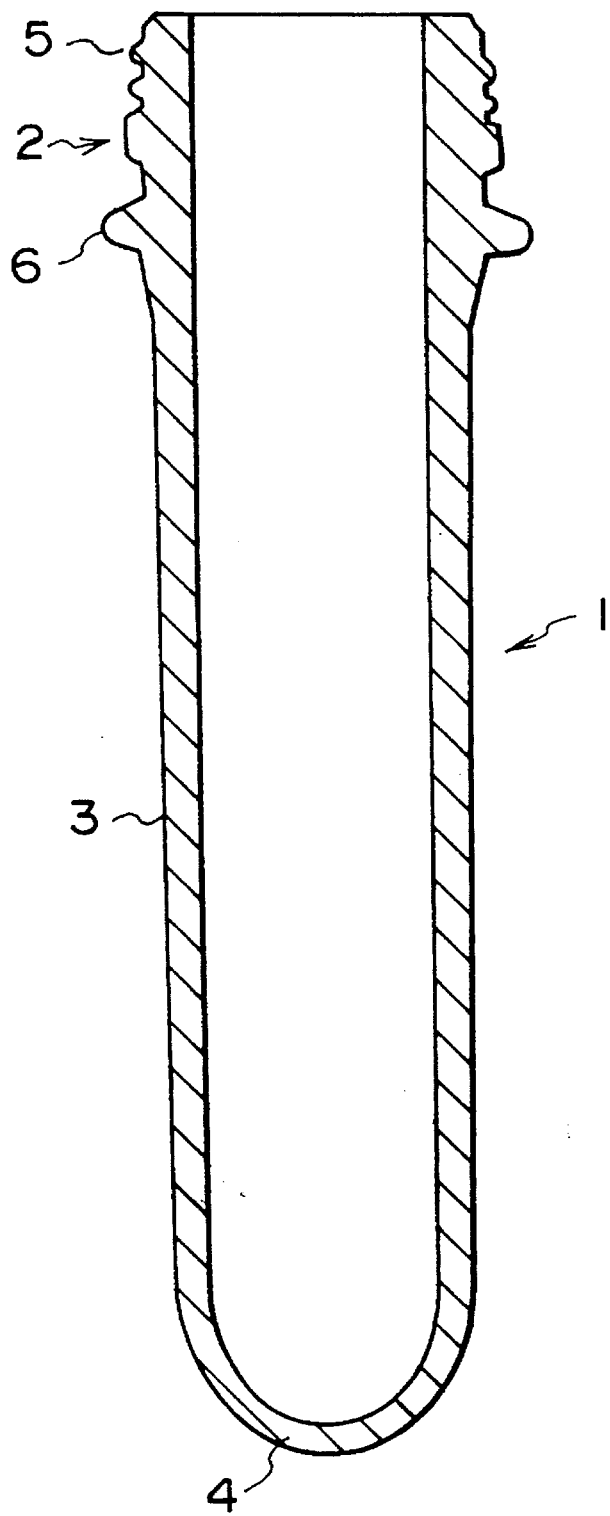
FIG. 1 is a side view illustrating a preformed article used in the present invention.

The present invention is concerned with a method of producing a heat-resistant container having a bottom portion of a reduced thickness and excellent heat resistance relying upon the two-step blow-molding method and a container produced by this method.

According to the study conducted by the present inventors, it was found that a bottom portion having favorable heat resistance is obtained when the bottom portion of the container is drawn at a relatively high draw ratio to reduce its thickness and when this portion is heat-set, so that the crystallinity at the bottom portion is increased to be not smaller than, for example, 35%. In producing such a container relying upon the two-stage blow-molding method, it was further found that the thickness of the bottom portion of the secondary article subjected to the primary blow molding must have been reduced.

The inventors have furthered the study and have learned that the degree of drawing the bottom portion of the secondary article, i.e., the degree of reducing the thickness, greatly affects properties of the container. For example, when the bottom portion of the secondary article except the central thick portion is drawn to a small degree and has a thickness of not smaller than 0.8 mm, the bottom portion is whitened when it is heated in an attempt to obtain a desired crystallinity by heat-setting. In the bottom portion that is whitened, the degree of crystallization by orientation is small and the crystallinity is raised due chiefly to sphereulit creating a relatively brittle state. When the whitened portion exists over a relatively wide area, the shock resistance decreases. Moreover, the whitened portion has poor transparency. Therefore, the whitened portion that exists over a wide area deprives the container of commercial value in regard to its appearance.

It was found that the crystallinity can be increased to a desirable range without developing whitening when the secondary article is heat-set, the secondary article having a bottom portion of which the thickness is reduced to be not larger than 0.6 mm except the central thick portion by effecting the drawing to a relatively high degree. However, the bottom portion having a reduced thickness as a result of being drawn to a relatively high degree tends to be shrunk in large amounts upon heating, which is a new problem.

That is, when the secondary article having a bottom portion of a domed shape which is drawn to a high degree to have a reduced thickness is heated for its barrel portion and bottom portion simultaneously, the bottom portion undergoes shrinking to a considerable degree yet maintaining roughly the domed bottom shape. When the secondary article of this state is subjected to the secondary blow molding, the bottom corner portion is drawn excessively and becomes locally very thin to lose the strength. Moreover, the portions which are re-drawn to a large extent loses crystallinity resulting in a decrease in the heat resistance.

Furthermore, the secondary article having a bottom portion of a shape close to the recessed shape of a final product may be subjected to the primary blow molding with the central portion of bottom of the preform article sandwiched by the stretch rod and the press rod, in order to reduce the thickness of the bottom portion to be not larger than about 0.6 mm. In this case, there remains a portion having a relatively large thickness at the center of the bottom. When such a secondary article is heated at its barrel portion and bottom portion, the recessed portion in the bottom of the secondary article grows extremely and becomes deep. Therefore, the bottom portion shrinks to have a very decreased bottom diameter, so that the final shape after heated becomes considerably different from the shape of bottom of the product. When the article of this state is subjected to the secondary blow molding, the bottom corner portion is drawn to an excess degree and the thickness becomes too small.

The present inventors have further forwarded the study and have discovered the fact that when a roughly dome-shaped bottom portion of the secondary article having a thickness of not larger than 0.6 mm except the central portion of bottom is, first, heated in a non-contacting manner, the bottom portion shrinks into a shape of a flat plate or a shape which has a recessed portion at the center and a flat periphery yet substantially maintaining the bottom diameter, and that when the tertiary article of which the bottom portion is heat-shrunk is heated for its barrel portion and bottom portion, the barrel portion chiefly undergoes the shrinking with the bottom portion roughly maintaining its shape of when it was initially heated, enabling the bottom portion of a quaternary article that is heated to be brought close to the shape of the final product. Moreover, when the quaternary article that is heated at a high temperature is subjected to the secondary blow molding, the bottom portion is redrawn to a low degree to assume a thickness of not larger than 0.6 mm as maintaining high crystallinity except the thick portion at the center of bottom. There is thus obtained a product which is crystallized to a sufficient degree by the heat treatment and has a bottom corner portion that has a suitable thickness and crystallinity.

In the two-step blow-molding method of the present invention as described above, a article just before being subjected to the secondary blow molding, i.e., a quaternary article that has passed through the heat-shrinking step after it was primary blow-molded, is obtained in a form which is as close as possible to the form of the final product that is desired, in order to decrease the redraw ratio in the step of secondary blow molding, to uniformalize the thickness of the products and to prevent a drop in the crystallinity. For that, it is important that the bottom portion of the article (quaternary article and tertiary article) of before being subjected to the secondary blow molding is formed in a plate-like shape or in a shape in which the central portion of bottom is recessed and the periphery is flattened.

In order for the quaternary article (or tertiary article) of the present invention to assume such a bottom shape, it is essential that the secondary article obtained by subjecting the preform article to the primary blow molding has a domed bottom without substantially containing undrawn portions (hereinafter referred to as first embodiment) or has a domed bottom with an undrawn thick portion at the center of the bottom, the thick portion being slightly recessed inwardly of the container from the lowest portion of the bottom (hereinafter referred to as second embodiment).

The domed bottom portion of the secondary article shrinks upon heating substantially like a flat plate. During the heating, however, a thin portion which is quickly heated tends to shrink first. It is therefore desired that the bottom portion of the secondary article has a relatively uniform thickness distribution. The central portion of bottom of the preform article is formed by the injection molding to have a thickness which is larger than that of other portions and, hence, the thickness of the secondary article changes depending upon the condition of locking the central portion of bottom at the time of the primary blow molding. According to the first embodiment of the present invention, it is desired that the thickness at the central portion of bottom is not larger than 2 times and, particularly, not larger than 1.5 times the thickness of other portions of the bottom. According to the second embodiment, furthermore, it is desired that the thick portion at the center of bottom is not smaller than 1.5 times and, particularly, not smaller than 2 times the thickness of other portions of the bottom. When the thickness of central portion of the bottom is small, there results a flat shape upon heating the bottom portion without forming inwardly recessed portion.

Then, the whole bottom portion of the secondary article is heated at a temperature higher than a shrinking temperature, so that the bottom portion is preferentially shrunk. According to the first embodiment, therefore, there is obtained a tertiary article in which the domed bottom portion is shrunk like a flat plate but the diameter is not almost changed. According to the second embodiment, furthermore, there is obtained a tertiary article in which the central portion of the bottom is recessed to an increased degree and the periphery thereof is flattened without, however, almost permitting the diameter to change.

Even when the secondary article has a thick portion which is relatively thin at the center of the bottom portion, a recessed portion can be formed at the center of the bottom portion by effecting the heat-shrinking while pushing the thick portion. Deformation of the central portion in the bottom upon pushing proceeds accompanying the shrinking and softening as the bottom portion is heated and, hence, the bottom portion can be recessed and the periphery thereof can be flattened without substantially accompanied by drawing. Accordingly, the bottom can be recessed with a relatively small pushing force, and the bottom portion only can be processed without affecting the barrel portion of the article.

The tertiary article having such a bottom shape is processed at a small rate in the secondary blow molding. Accordingly, a desired thickness distribution is maintained in the bottom portion and a drop in the crystallinity is effectively prevented.

The container obtained by the method of the present invention has a neck portion, a barrel portion that is drawn and is heat-set, and a bottom portion which includes a central portion of bottom having a thick portion at the center and is inwardly recessed in the axial direction of the container and a peripheral grounding portion which downwardly extends in the axial direction beyond the central portion of the bottom.

The bottom portion of the container has the central portion of bottom and the peripheral grounding portion that extends inwardly in the axial direction from the central portion of bottom, has a uniform thickness even in the bottom corner portions except the central portion of bottom that is inwardly recessed, and is oriented and crystallized by drawing, and is further crystallized to a high degree by the heat treatment. Therefore, the bottom portion maintains excellent self-standing stability. Owing to the uniform crystallization, furthermore, the bottom portion exhibits excellent shock resistance. Moreover, the self-standing structure of the bottom portion is prevented from being deformed by the heat, and the self-standing stability is excellently maintained even after the bottle is filled with hot content.

Moreover, the portions, excluding relatively thick portions such as neck portion, part of the barrel portion continuous to the neck portion, and thick portion at the center of the bottom, have a thickness of as small as not larger than 0.6 mm, are molecularly oriented so as to have birefringence represented by a relation (2) described later of not smaller than 0.070 in (the circumferential direction—the thickness direction), and are further crystallized by the heat set so as to have a crystallinity represented by a relation (1) described later of not smaller than 35%.

Figure 11:
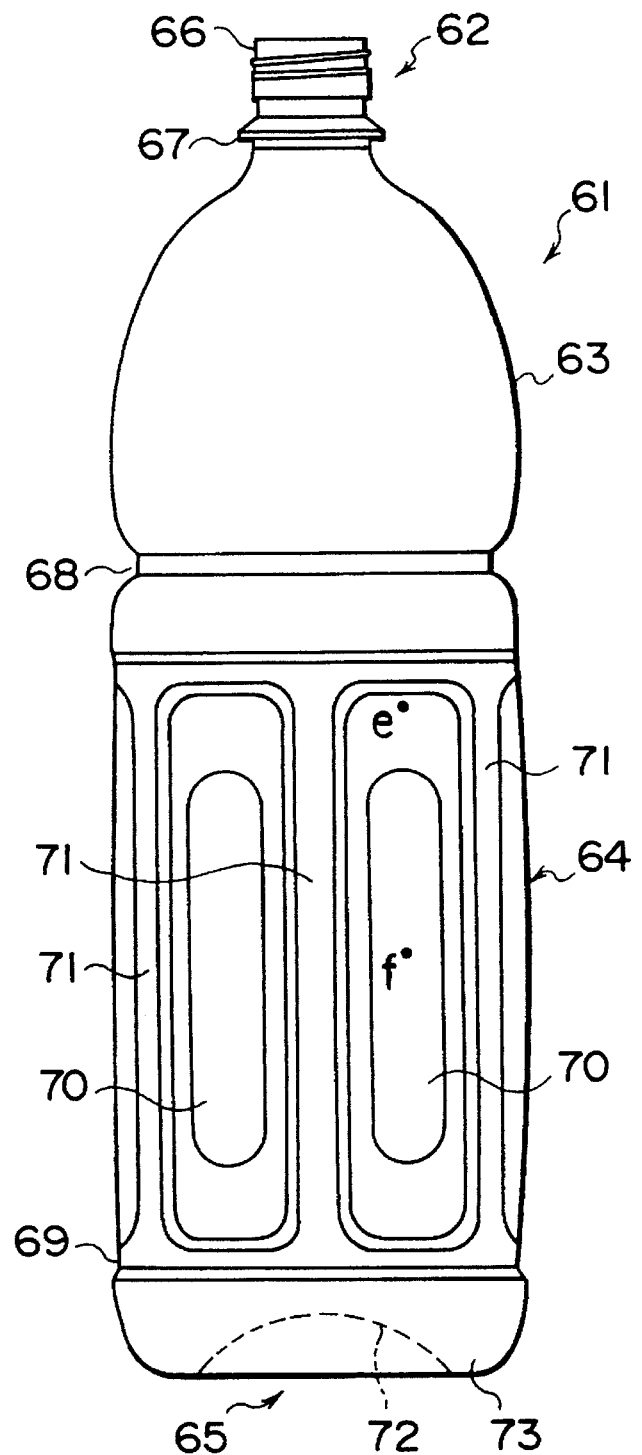
FIG. 11 is a side view for explaining the structure of a polyester bottle of the present invention.
Figure 12:
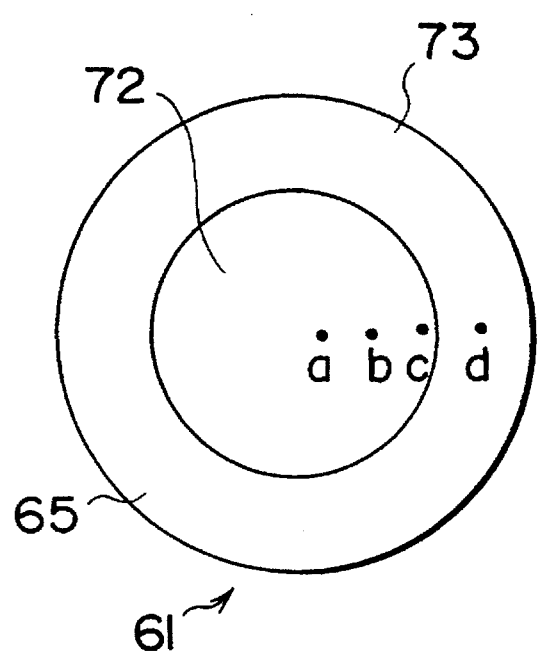
FIG. 12 is a bottom view of the bottle of FIG. 12.

FIGS. 11 and 12 illustrate a bottle according to the present invention together with thickness sampling positions on the wall of the bottle including a position a near the thick portion at the center of the bottom, a position c at the periphery of the center of the bottom, an intermediate position b thereof, a grounding portion d and an intermediate position e of the barrel portion. These positions serve as sampling positions that will be described later in the embodiments. Reference should be made to Tables 1 and 2 of embodiments described later. In the bottle of the present invention, the thickness is not larger than 0.6 mm even at the position a or the position b which becomes the thickest. Namely, even at the position d which becomes the thinnest, the thickness is reduced to be from 0.5 to 2 times as thick as the thickness at the intermediate position e of the barrel portion. This is quite an astonishing fact. Moreover, Tables 1 and 2 show relationships between the positions on the wall of the bottle and the crystallinity as well as birefringence near the thick portion at the center of the bottom. Even near the thick portion at the center of the bottom which is most likely to remain undrawn, a high degree of orientation has been accomplished exhibiting a birefringence of not smaller than 0.07 like that of the barrel portion. The high degree of molecular orientation near the thick portion at the center of the bottom is due to the fact that the thickness of the portion near the thick portion at the center of the bottom is greatly decreased at the time of stretch-blow molding. By effecting the heat setting in the thus highly molecularly oriented state, crystallization of not smaller than 35% can be imparted even to the vicinity of thick portion at the center of the bottom, the crystallinity being from 0.8 to 1.4 times as great as the crystallinity in the central portion of the barrel portion.

When the portions excluding relatively thick portions such as neck portion, part of the barrel portion continuous to the neck portion and thick portion at the center of the bottom, are thinner than the above-mentioned d range, the bottom portion lacks mechanical strength. When the above-mentioned portions are thicker than the above-mentioned range, the degree of orientation in the bottom becomes insufficient and the shock resistance becomes unsatisfactory. Similarly, when the crystallinity is smaller than 35%, heat resistance becomes insufficient and, particularly, self-standing stability becomes insufficient after the bottle is filled with hot content.

Furthermore, structure for symmetrical panel-sinking stability in the vacuum pressure constituted by a panel portion and a rib is formed on the uniformly oriented and crystallized barrel portion of the quaternary article in the final step of blow molding and, besides, the heat set is effected relying upon the non-contacting heating system. Thus, the crystallinity of the outer side which tends to increase is decreased, so that the crystallinity becomes nearly the same on the inner side and on the outer side of the barrel panel portion or the crystallinity becomes larger on the inner side. Therefore, the bottle is prevented from being deformed in a deviated manner when it is filled with hot content. When the pressure decreases with a decrease in the temperature, the panel effectively undergoes paneling deformation and the container is effectively prevented from being asymmetrically deformed. This will become obvious from embodiments that will be described later.

DETAILED DESCRIPTION OF THE PREFERRED EMBODIMENTS

According to the present invention, the preform article heated at a drawing temperature (90° to 110° C.) is subjected to the primary blow molding by either a free blow-molding method which effects the blow molding without using the metal mold or a metal mold blow-molding method which effects the blow molding using the metal mold, thereby to obtain a secondary article. At this moment, the thickness of barrel portion and bottom portion of the secondary article is decreased to be substantially not larger than 0.6 mm and, preferably, 0.2 to 0.5 mm except the undrawn portion at the center of the bottom and vicinity of the neck portion, and, then, the heating is effected within a short period of time in the step of heat shrinking and heat set. When the thickness of the portion being heated exceeds 0.6 mm, the temperature distribution becomes too great in the direction of thickness by the heating in a short period of time and a desirable temperature range cannot be accomplished.

In producing the secondary article by subjecting the preform article to the primary blow molding, it is desired that the drawing ratio in the axial direction is from 2 to 5 times and, particularly, from 2.2 to 4 times and that the drawing ratio in the circumferential direction is from 2.5 to 6.6 times and, particularly, from 3 to 6 times. In the free blow-molding system, the drawing ratios in the axial direction and in the circumferential direction are determined depending upon the shape of the preform article, heating temperature and blow-molding pressure or blow-molding conditions such as drawn form by using a stretch rod, etc.

Next, the secondary article is subjected to the step of heat set where the bottom portion is preferentially heated to obtain a tertiary article having a bottom portion of a flat shape or of a shape in which the center of the bottom portion is recessed. In this case, it is of course allowable to obtain the central portion of bottom in a recessed shape by the heating while pushing the center of the bottom portion. Then, the bottom portion and the barrel portion are heated to obtain a quaternary article in which chiefly the barrel portion is heat-shrunk in the direction of height and in the direction of diameter. A variety of heating means can be employed such as a heating system using the hot air, a solid-contact heating system by successively pushing a heating member of the form of a flat plate from the top of the dome. According to the present invention, however, it is particularly desired to employ an infrared heating system of the non-contact type. With the infrared heating system, part of the infrared-rays transmits into the interior of the plastic material and is absorbed compared with the heating based upon the conduction of heat from the surface by using the hot air and, hence, the heating is accomplished relatively efficiently. Furthermore, the secondary article may be passed in a revolving manner through a tunnel-like heating member constituted by combining planar infrared radiating members to accomplish the heating within a relatively short period of time of from about 1 to about 15 seconds.

The temperature at which the secondary article starts shrinking upon the heating varies depending upon the drawing conditions of the primary blow molding, temperature at a moment of releasing the internal pressure of the secondary article formed through the primary blow molding, etc. Usually, the secondary article starts shrinking at a temperature of from about 60° to about 140° C. The temperature of the secondary blow molding is usually from 90° to 110° C. or higher, and the secondary article is heated at a shrinking temperature and at a drawing temperature or higher. In the case of the heat-resistant container, it is desired that the barrel portion and bottom portion of the secondary article are finally heated at about 130° to about 220° C., so that it is heat set to have a sufficient crystallinity.

The quaternary article that is heated shrinks and is crystallized and in which the residual stress is relaxed. Furthermore, the quaternary article is cooled to some extent before it is subjected to the step of the secondary blow molding, and the temperature difference between the inner surface and the outer surface is relaxed due to the effect of heat conduction in the direction of thickness. Usually, a relaxation time of from about 0.3 to about 3 seconds is provided.

In the step of secondary blow molding, the quaternary article that is heated is stretch-blow-molded by using a metal mold which includes a bottom portion and a barrel portion while holding the mouth and the neck. It is desired that the secondary blow molding is carried out by using a gas of 15 to 40 Kg/cm$^2$. For the containers that require heat resistance, it is desired that the temperature of the metal mold is maintained at about 70° to about 130° C. while preventing the article from quickly cooling during the secondary blow molding.

In the present invention, any plastic material can be used provided it can be stretch-blow-molded and heat-set. Advantageously, however, there can be used a thermoplastic polyester and, particularly, an ethylene terephthalate thermoplastic polyester. It is allowable to use a polycarbonate or an arylate resin as a matter of course.

As the ethylene terephthalate thermoplastic polyester, there can be used a thermoplastic polyester in which ethylene terephthalate units occupy most of, and, generally, not smaller than 70 mol % of, and, particularly, not smaller than 80 mol % of the ester recurring units, the thermoplastic polyester having a glass transition point (Tg) of from 50° to 90° C. and, particularly, from 55° to 80° C., and a melting point (Tm) of from 200° to 275° C. and, particularly, from 220° to 270° C.

Though a homopolyethylene terephthalate is desirable from the standpoint of heat resistance, it is also allowable to use a copolymerized polyester containing small amounts of ester units other than the ethylene terephthalate units.

Examples of the dibasic acid other than terephthalic acid include aromatic dicarboxylic acid such as isophthalic acid, phthalic acid, naphthalenedicarboxylic acid and the like acid; alicyclic dicarboxylic acid such as cyclohexanedicarboxylic acid and the like acid; and aliphatic dicarboxylic acid such as succinic acid, adipic acid, sebacic acid, dodecanedioic acid and the like acid, which may be used in a single kind or in a combination of two or more kinds. As the diol components other than ethylene glycol, there can be exemplified propylene glycol, 1,4-butanediol, diethylene glycol, 1,6-hexylene glycol, cyclohexane dimethanol, ethylene oxide adduct of bisphenol A, which may be used in a single kind or in a combination of two more kinds.

The ethylene terephthalate thermoplastic polyester that is used should have a molecular weight which is large enough for forming, at least, a film, and should be the one of the injection grade or of the extrusion grade depending upon the use. It is desired that the intrinsic viscosity (I.V.) generally lies from 0.6 to 1.4 dl/g and, particularly, from 0.63 to 1.3 dl/g.

The plastic material is molded into a preform article by the injection molding. That is, the plastic material is melt-injected into an injection mold that is cooled, and is cooled to obtain an amorphous preform article of the plastic material.

FIG. 1 illustrates an example of the preform article. The preform article 1 comprises a neck portion 2, a barrel portion 3 and a closed bottom portion 4, and the neck portion 2 is provided with a closure-fastening mechanism 5 such as screw and a support ring 6 for holding the container.

Any widely known injection machine can be used which is equipped with an injection plunger or a screw, and the mixture is injected into the injection mold through nozzle, sprue and gate. Then, the polyester and the like flow into the cavity of the injection mold where they are solidified into a preform article for stretch-blow molding.

There is used an injection mold having a cavity that corresponds to the shape of the container, and it is desired to use an injector of the one-gate type or the multi-gate type. It is desired that the temperature of injection is from 270° to 310° C. and the pressure is from about 28 to about 110 Kg/cm$^2$.

In order to enhance the heat resistance and rigidity at the mouth of the bottle, furthermore, it is desired to crystallize and whiten the mouth of the preform article by heating in advance. Crystallization of the mouth portion by heating is effected by heating the mouth portion of the preform article at a temperature of generally from 140° to 220° C. and, particularly, at 160° to 210° C. in a state where the mouth portion is thermally insulated from other portions. It is desired that the crystallinity at the mouth portion of the preform article is not lower than 25%.

The bottom portion of the preform article can similarly be crystallized by heating over a range of a diameter of about 8 mm in advance. This makes it possible to enhance the heat resistance and rigidity at that portion and to prevent amorphous undrawn portion and lowly drawn portion from remaining near the center of the bottom at the time of stretch-blow molding. When the preform article is blow-molded being sandwiched between the stretch rod and the press rod, furthermore, the portion that is held is the central portion of the bottom. It is therefore desired that this portion is whitened by being crystallized.

The invention will now be described in detail with reference to the accompanying drawings.

FIG. 2 illustrates steps for producing a heat-resistant container according to a first embodiment of the present invention, wherein a preform article 11 (FIG. 2(A)) obtained by the injection molding or the like is heated at a drawing temperature (90° to 110° C.) and is biaxially stretch-blow-molded by the free blowing to obtain a secondary article 12 (FIG. 2(B)) having a domed bottom. Usually, the thick portion at the center of the domed bottom of the secondary article 12 that is obtained has been substantially drawn and has a thickness of not larger than two times as large as the thickness of other portions of the bottom.

The whole bottom portion of the secondary article 12 is heated at a temperature higher than the shrinking temperature, so that it is shrunk. The domed bottom portion has been blown to a sufficient degree at the time of the primary blow molding except the central portion and the vicinity thereof, and shrinks like a flat plate upon heating in a manner that the surface area decreases. At this moment, the diameter of the bottom portion does not almost change. Heat-shrinking of the bottom portion starts with the center of the bottom and then successively spreads in the direction of diameter.

To obtain the bottom portion of the secondary article in a flat shape by heating, it is important that the thickness of thick portion at the center of bottom of the secondary article 12 is relatively small as described above. It is desired that the thickness of thick portion at the center of bottom is not larger than two times and, particularly, not larger than 1.5 times as large as the thickness of other portions of the bottom. When the thickness of thick portion at the center of the bottom is larger than two times as large as the thickness of other portions of the bottom, the thick portion at the center of the bottom tends to shrink in a protruded manner when the bottom portion of the secondary article is heated.

The temperature at which the secondary article starts shrinking upon heating varies depending upon the conditions for blow-molding the secondary article and, particularly, upon the temperature at a moment when the secondary article shrinks after it is blow-molded and the blow pressure is released. Usually, therefore, the heat-shrinking starts in a temperature region which is higher than the above-mentioned temperature. In the blow-molding system using a metal mold, the temperature at which the secondary article shrinks is affected by the temperature of the metal mold, by the contacting state between the metal mold and the secondary article and the time thereof, and the degree of cooling by the blow of air.

The bottom portion is heated by an infrared heating member 13 in a non-contacting manner as shown in FIG. 2(C). With the heating system using infrared-rays, a planar heating member 13a is installed in parallel with the bottom portion and a heating member 13b is installed to be corresponded to the corner portion of the bottom. The heat-shrinking successively proceeds starting with the central vertex of the semi-spherical bottom which is closest to the heating member 13a. In this case, the outer diameter of the flat bottom plate that is formed can be determined by adjusting the heating region and the degree of heating. It is desired that the outer diameter of the flat bottom portion is usually slightly smaller than the diameter of the bottom of the metal mold for secondary blow molding so as to be held in the metal mold for secondary blow molding.

The tertiary article 14 having flat bottom portion that is heated as described above is then heated at its barrel portion and bottom portion by infrared heating members 15a and 15b as shown in FIG. 2(D) to obtain a quaternary article 16 of which the barrel portion and bottom portion are heated at a desired crystallization temperature. At this moment, the tertiary article 14 is heated while largely maintaining the shape of the bottom portion that is shrunk. As shown in FIG. 2(D), therefore, the quaternary article 16 is shrunk at its barrel portion in the direction of height and in the direction of diameter except the bottom portion and part of the barrel portion close to the bottom portion. It is essential that the quaternary article 16 has a shape which is slightly smaller than the metal mold for secondary blow molding.

The quaternary article 16 heated up to the crystallization temperature is blow-molded in a metal mold 17 for secondary blow molding in the step of secondary blow molding shown in FIG. 2(E), and is then taken out as a finally article 18 as shown in FIG. 2(F).

FIG. 3 illustrates steps for producing the heat-resistant container according to the second embodiment of the present invention.

Figure 3A:
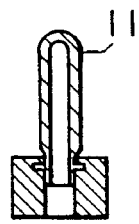
FIGS. 3A–3G are diagrams illustrating a step of molding according to a second embodiment of the present invention.
Figure 3B:
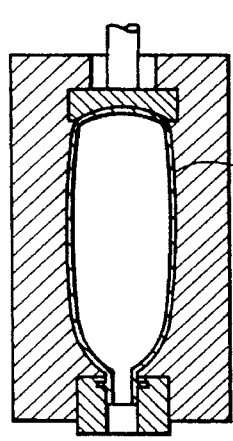

Referring to FIG. 3(A) like in FIG. 2(A), a preform article 11 is heated at a drawing temperature (90° to 110° C.), and is biaxially stretch-blow-molded in a metal mold to obtain a secondary article 12 having a domed bottom (FIG. 3(B)).

Figure 3C:
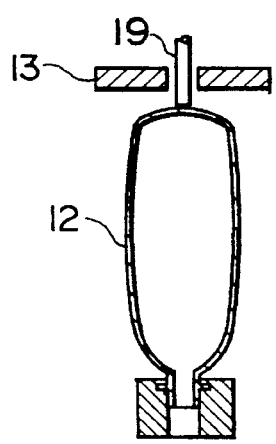

Referring to FIG. 3(C) illustrating a step of heat-shrinking the secondary article while pushing the bottom portion, a heating member 13 and a pushing rod 19 that moves up and down are arranged being corresponded to the bottom portion. In this Step, the bottom portion of the secondary article 12 is heated by the heating member 13 at a temperature higher than the shrinking temperature so that it shrinks and, at the same time, the pushing rod 19 descends from the upper side to push the center of the bottom to form a recess. It is desired that the pushing rod descends at a rate at which the domed bottom portion of the secondary article shrinks into a flat plate, and that the bottom portion is pushed with a relatively small force which is equal to the self weight of the pushing rod or is about several kilograms, and that the pushing rod stops descending after a predetermined recess is formed. In pushing the bottom portion of the secondary article, therefore, the recess is formed without substantially accompanied by the drawing.

Figure 3D:
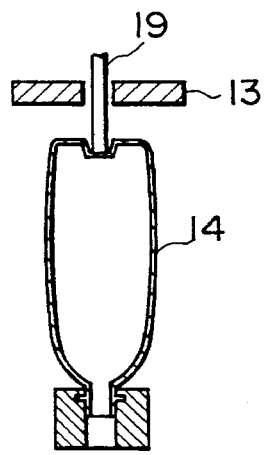

The domed bottom portion of the secondary article is recessed at its central portion inwardly of the container being pushed by the pushing rod, and has been drawn to a sufficient degree through the primary blow molding except the central portion at the bottom and the vicinity thereof. Upon heating, furthermore, the domed bottom portion is shrunk like a flat plate in a manner to decrease the surface area, and a tertiary article 14 is formed having a bottom of a shape as shown in FIG. 3(D). The diameter of the bottom portion of the tertiary article is little changed from that of the secondary article. It is desired that the bottom portion starts heat-shrinking from the central vertex of the bottom, the heat-shrinking gradually spreading in the direction of diameter.

The bottom portion is heated by an infrared heating member 13 in a non-contacting manner as shown in FIG. 3(C). The degree of recess at the center of the bottom portion can be adjusted depending upon the amount of change in the volume of the flat portion formed by heat-shrinking the bottom portion and the pushing degree the pushing rod. It is further desired that the heating is so adjusted that the outer diameter of the flat bottom portion is usually slightly smaller than the diameter of the bottom of the metal mold for secondary blow molding so as to be held in the metal mold for secondary blow molding.

The tertiary article 14 which is recessed at the center of the bottom portion and having flat peripheral portion that is obtained as described above is then heated at its barrel portion and bottom portion by infrared heating members 13 and 15 as shown in FIG. 3 (E) to obtain a quaternary article 16 of which the barrel portion and bottom portion are heated at a desired crystallization temperature. At this moment, the pushing rod 19 has been raised upwards already. The tertiary article 14 is heated while largely maintaining the shape of the bottom portion that is shrunk and, hence, the quaternary article 16 is shrunk at its barrel portion in the direction of height and in the direction of diameter except the bottom portion and part of the barrel portion close to the bottom portion as shown in FIG. 3(E). It is essential that the quaternary article 16 has a shape which is slightly smaller than the metal mold for secondary blow molding.

Figure 3E:
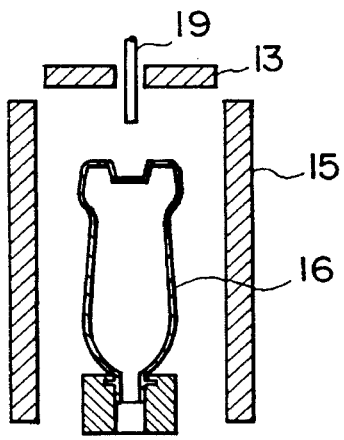
Figure 3F:
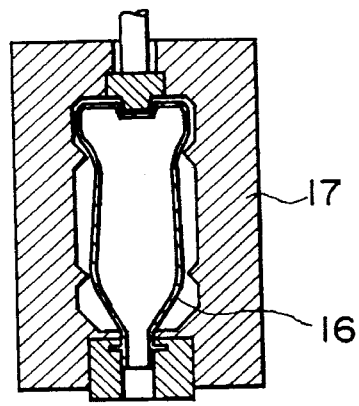
Figure 3G:
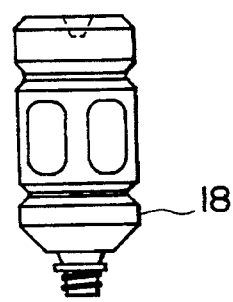

The quaternary article 16 heated up to the crystallization temperature is blow-molded in a metal mold 17 for secondary blow molding in the step of secondary blow molding shown in FIG. 3(F), and is then taken out as a final product 18 as shown in FIG. 3(G).

In either the first embodiment or the second embodiment, the shape of the quaternary article can be easily brought close to the shape of the metal mold for secondary blow molding through the above-mentioned steps, whereby the redraw ratio at the bottom corner portion can be suppressed to a small value during the secondary blow molding. As a result, a finally product having excellent strength and heat resistance is obtained. Furthermore, the secondary article has a domed shape which is swollen outwardly. In the primary blow molding, the bottom portion is allowed to have a relatively uniform thickness except the central thick portion and the vicinity thereof. Even in the tertiary article, quaternary article and the final product, the bottom is allowed to possess a relatively uniform thickness. Accordingly, there is obtained a blow-molded container having a relatively thin bottom portion yet exhibiting excellent strength and heat resistance and making it possible to decrease the weight.

In the heat-resistant container, the quaternary article of just before subjected to the secondary blow molding is usually maintained at a temperature of from 130° to 220° C. so that the crystallization proceeds upon heating. The quaternary article is then subjected to the secondary blow molding to impart excellent heat resistance. In particular, the whole bottom portion is subjected to the drawing/heat-shrinking to improve the strength and is further subjected to the step of crystallization upon heating. Therefore, a desired strength and high heat resistance can be imparted to the bottom portion. Moreover, the weight can be decreased as a result of reducing the thickness of the bottom portion.

Figure 4A:
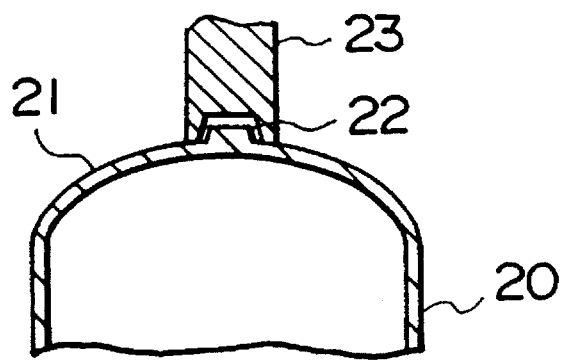
FIGS. 4A and 4B are diagrams for explaining a: method of pushing the bottom portion of a secondary article according to the second embodiment of the present invention.
Figure 4B:
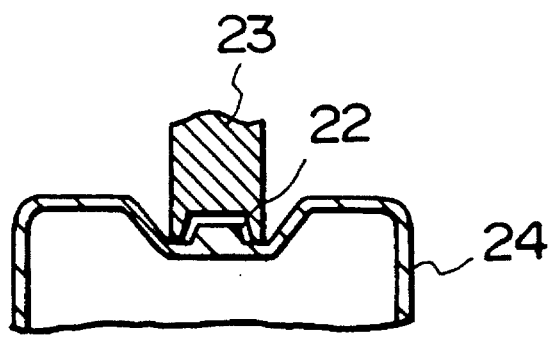

FIG. 4 illustrates a method of indenting the central portion of bottom of the secondary article by pushing it according to the second embodiment of the present invention. Referring to FIG. 4(A), the bottom portion 20 of the secondary article has domed bottom portion 21 that is sufficiently drawn and a central thick portion 22 which is not drawn. A pushing rod 23 which moves up and down has a recessed shape at its tip portion so as to surround the central undrawn thick portion 22 of the bottom, and pushes the periphery of the thick portion 22. Being heated by the heating member (not shown) and being mechanically pushed by the pushing rod, the bottom portion 20 of the secondary article turns into a tertiary article 24 having bottom of a shape as shown in FIG. 4(B). The tertiary article 24 has the bottom portion in which the thickness of the thick portion 22 remains unchanged but the center of the bottom is recessed inwardly of the container and the periphery thereof is flattened. The above-mentioned heating means can be put into practice without being affected by the thickness of thick portion 22 at the center of bottom of the secondary article, and can be adapted even for the secondary articles that are obtained by the free blow molding.

Figure 5:
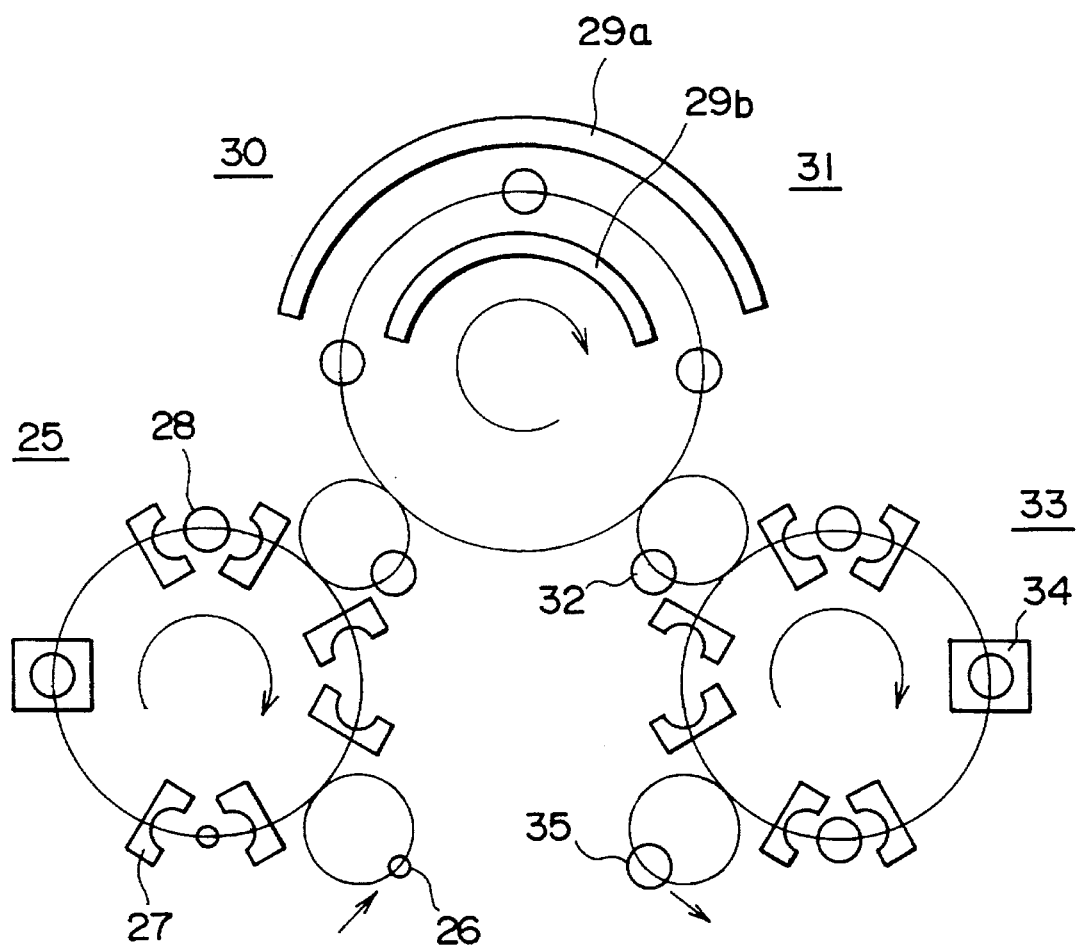
FIG. 5 is a diagram illustrating the whole arrangement of a production apparatus with which the method of the present invention is put into practice.

FIG. 5 is a diagram illustrating an apparatus for producing the biaxially stretch blow-molded container according to the method of the present invention wherein in a primary blow-molding step which is generally designated at 25, a preform article 26 is fed to a metal mold 27 for primary blow molding where it is blow-molded. Then, a secondary article 28 passes through a tunnel-like heating device 29 constituted by a pair of infrared heating members 29a and 29b opposed to the barrel portion and a planar infrared heating member that is not shown but is opposed to the bottom portion (bottom-processing step 30). When a pushing rod is used in the second embodiment, then, the heating device is provided with the pushing rod that is opposed to the central portion of the bottom though not diagramed.

Therefore, the secondary article 28 is indented at the center of the bottom, flatly shrunk in the periphery thereof, and is shrunk at its barrel portion in the direction of height and in the direction of diameter, and is finally heated up to a crystallization temperature (heat-setting step 31) to turn into a quaternary article 32. Then, the quaternary article 32 is fed to a metal mold 34 for secondary blowing in a secondary blow-molding step which is generally designated at 33, subjected to the secondary blow molding, and is taken out as a final product 35.

In this apparatus, the above-mentioned first bottom heating (FIGS. 3(C) and 3(D)) and the second barrel/bottom heating (FIG. 3(E)) are accomplished as the secondary article 28 proceeds while revolving through the infrared heating apparatus 29 which has a tunnel-like cross section that resembles FIG. 3(E) and is arranged along a circumference. The infrared heating members constituting the infrared heating device 29 are divided into several sections along the circumference, and are adjustable for their temperatures, and are further so controlled that the temperature at the bottom portion of the secondary article rises higher than the temperature of the barrel portion. Firstly, therefore, the central portion of the bottom is indented and the periphery thereof is flatly shrunk. Secondly, the barrel portion shrinks and, finally, the barrel portion and the bottom portion are heated at a predetermined crystallization temperature.

According to the method of the present invention, a variety of changes can be added to the above-mentioned basic steps.

Figure 6:
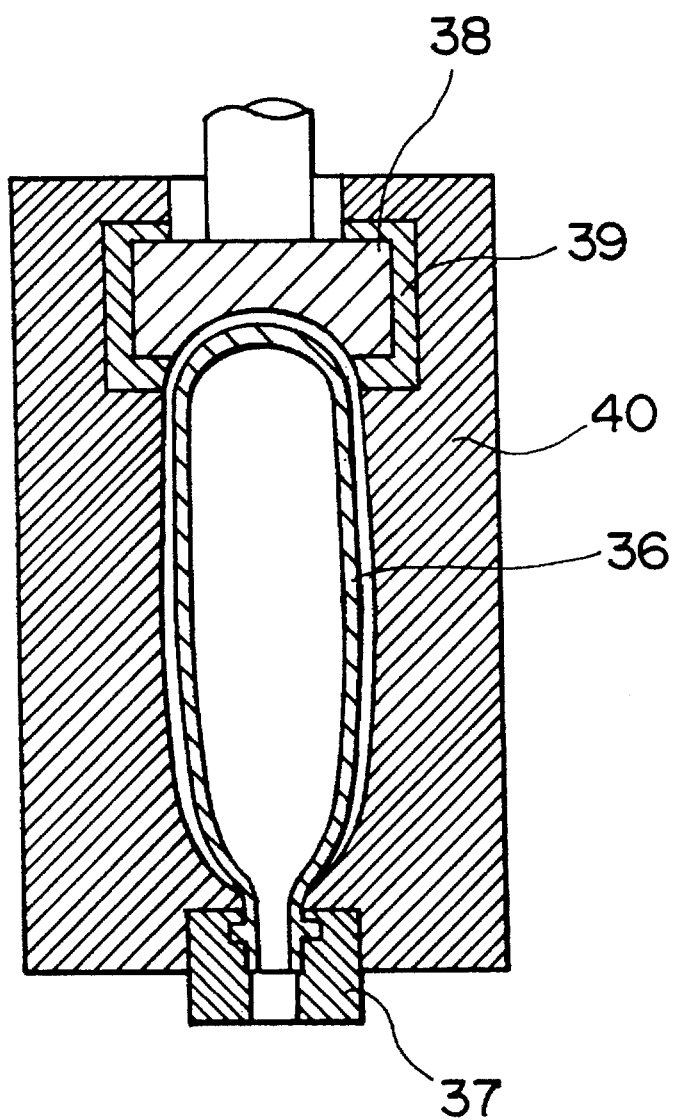
FIG. 6 is a diagram illustrating a step of primary blow molding according to the first embodiment of the present invention.

For instance, the primary blow molding is effected by using the metal mold for primary blow molding of which the bottom portion is heated at a temperature higher than the barrel portion to obtain a secondary article of which the bottom portion is heated at a temperature higher than the barrel portion, so that the bottom portion of the secondary article is flattened by the heat shrinking. The metal mold for primary blow molding can be represented by the one which, as shown in FIG. 6, is constituted by a securing portion 37 for securing the mouth of the secondary article 36, a semi-spherical bottom mold 38 of a relatively high temperature, a heat insulating layer 39 surrounding the bottom mold 38, and a barrel metal mold of a relatively low temperature.

Figure 7A:
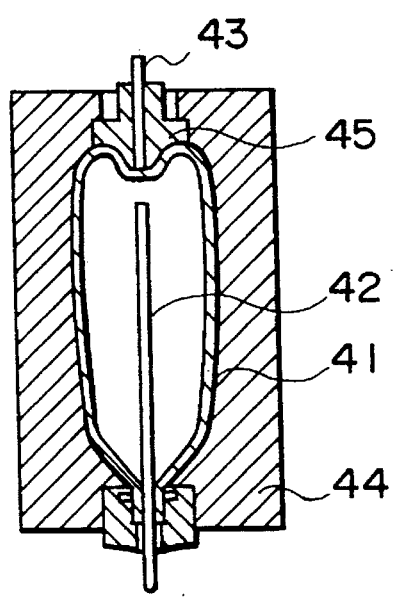
FIGS. 7A–7D are diagrams illustrating a step of molding according to the second embodiment of the present invention.

FIG. 7 illustrates the steps for producing the heat-resistant container according to the second embodiment of the present invention, wherein FIG. 7(A) illustrates a state where a secondary article 41 is formed by subjecting the preform article to the primary blow molding. The secondary article 41 is blow-molded in the metal mold 44 for primary blow molding while the bottom portion thereof is sandwiched by a stretch rod 42 that is installed inside the preform article and a press rod 43 installed on the outside. The metal mold 44 for primary blow molding has a central portion of the bottom 45 which protrudes inwardly of the metal mold and has a domed periphery which protrudes toward the side of the metal mold. By using this metal mold for primary blow molding, the central portion of bottom of the secondary article 41 assumes a shape which is the same as that of the bottom portion 45 of the metal mold for primary blowing. FIG. 8 is a diagram illustrating, on an enlarged scale, the bottom portion of the secondary article. The secondary article has an undrawn thick portion 46 which is located near the center of the secondary article, the vicinity 47 of the undrawn portion being recessed inwardly of the container, and the periphery 48 thereof having a domed shape protruding upwards.

Figure 7B:
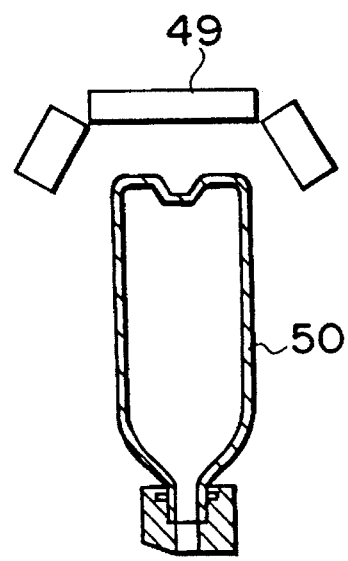
Figure 8:
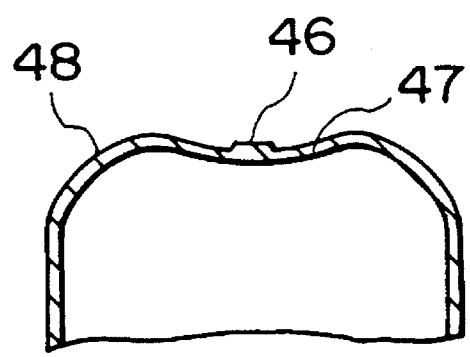
FIG. 8 is a diagram illustrating, on an enlarged scale, the shape of bottom portion of the secondary article obtained through the molding step shown in FIG. 7.
Figure 9:
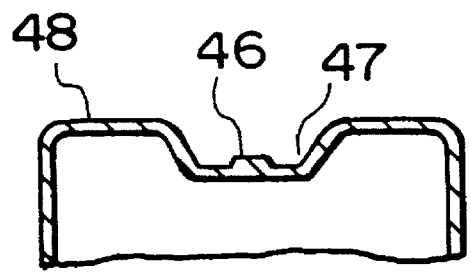
FIG. 9 is a diagram illustrating, on an enlarged scale, the shape of bottom portion of a tertiary article after the bottom portion of the secondary article shown in FIG. 8 is heated.

FIG. 7(B) illustrates a step for heating the bottom portion of the secondary article 41 formed in FIG. 7(A). When the recess near the central portion of the bottom of the secondary article is deeper by about 1 to 3 mm or more than the lowest point of the bottom, there can be obtained a tertiary article having a recessed bottom by heating the bottom using the infrared heating member 49. As shown in FIG. 9, the tertiary article 50 is recessed in the vicinity 47 of the central portion and has a periphery 48 of a flat shape. The diameter and depth of the recess at the central portion of the bottom of the tertiary article tend to increase as the bottom portion is heated. To obtain the tertiary article 50 having a recess at the center of the bottom, it is important that the thickness of the thick portion 46 at the center of bottom of the secondary article 41 is relatively larger than that of other portions of the bottom. It is desired that the thickness of the thick portion 46 at the center of bottom is not smaller than 1.5 times and, particularly, not smaller than 2 times of the thickness of other portions 47, 48 of bottom. When the thickness of the thick portion 46 at the center of bottom is not larger than 1.5 times of the thickness of other portions of bottom, the degree of a small recess near the central portion of bottom of the secondary article 41 does not increase upon heating but rather the recessed portion tends to be flattened.

Figure 7C:
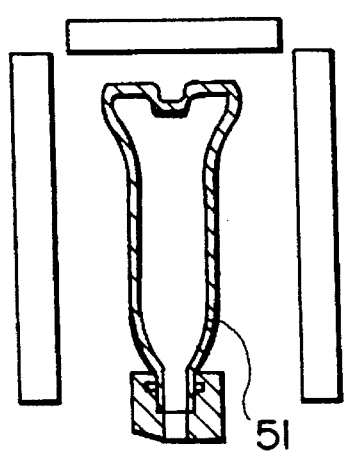
Figure 7D:
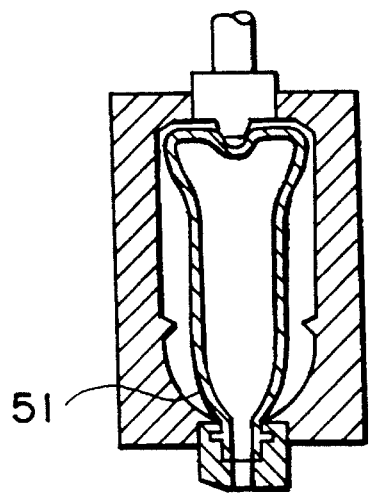

The tertiary article 50 of which the bottom portion is heated is further heated at its barrel portion and bottom portion as shown in FIG. 7(C), whereby the barrel portion is chiefly shrunk in the direction of height and in the direction of diameter while substantially maintaining the shape of the bottom portion unchanged and is crystallized by being further heated at about 130° to 220° C., so that a quaternary article 51 is obtained. The quaternary article 51 that is heated is subjected to the secondary blow molding in a metal mold to obtain a final product (FIG. 7(D)).

In the secondary blow molding of the heat-resistant container having the bottom of a shape which is recessed inwardly of the container as described above, the bottom mold, first, descends onto the quaternary article and, then, the barrel metal mold which is a split mold is closed to effect the blow molding. In this case, the recess at the center of the bottom of the quaternary article is selected to be slightly larger than the recess of the bottom mold, so that the quaternary article can be smoothly inserted in the metal mold for secondary blow molding and that the center of bottom can be easily aligned. Even when the height of the quaternary article is slightly higher than that of the metal mold for secondary blow molding, the recess in the bottom portion of the quaternary article is coupled to the metal mold, and the quaternary article is pushed without being deviated as the bottom mold descends and is held in the metal mold for secondary blow molding. With the quaternary article being brought close to the shape of the metal mold for secondary blow molding as described above, the redraw ratio can be decreased in the secondary blow molding and a final product can be obtained having excellent strength and heat resistance. Furthermore, since the recess at the central portion of the bottom of the secondary article can be decreased, the bottom portion in the primary blow molding is formed having a relatively uniform thickness except the central thick portion and its vicinity. The bottom portion has a relatively uniform thickness even in the tertiary article, in the quaternary article and in the final product.

According to the second embodiment of the present invention, furthermore, it is allowable to use a push/heat jig comprising a heated support plate 52 and a pushing rod 53 as shown in FIG. 10 in the step of heat-shrinking the bottom portion of the secondary article and pushing the central portion of the bottom. In the push/heat jig, the pushing rod 53 is supported by the heated support plate 52 via a resilient member 54 such as a spring so as to move up and down by itself. Moreover, the push/heat jig as a whole is allowed to move up and down and is, hence, installed being opposed to the bottom of the secondary article 55 (FIG. 10(A)). Referring to FIG. 10(B), the push/heat jig as a whole moves in the direction of arrow so that the heated support plate 52 comes into contact with the bottom portion of the secondary article 55. Then, the pushing rod 53 only moves downwards. Then, the bottom portion of the secondary article 55 is flattened by being heated by the heated support plate 52 in a contacted manner, an inwardly recessed central portion is formed in the bottom being pushed by the pushing rod 53, and whereby a tertiary article 56 is formed having the recessed central portion in the bottom and a flat periphery (FIG. 10(C)).

Figure 10A:
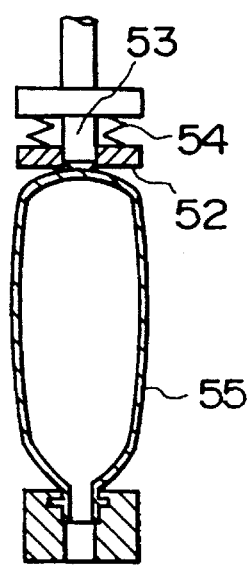
FIGS. 10A–10D are diagrams for explaining the step of molding according to the second embodiment of the present invention.
Figure 10B:
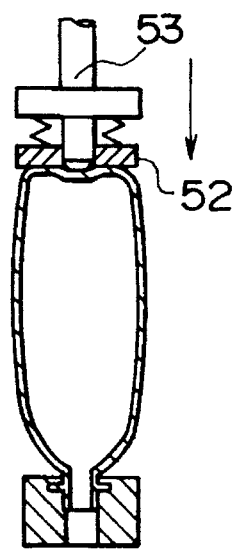
Figure 10C:
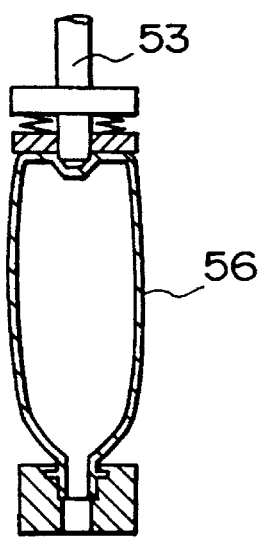
Figure 10D:
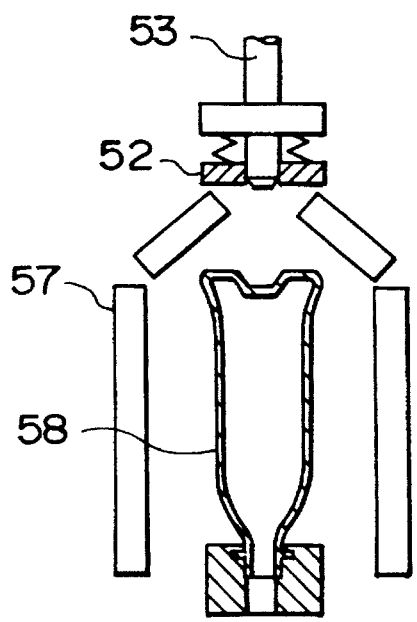

Thereafter, the whole push/heat jig moves upwards, and the tertiary article is heat-shrunk at its bottom portion and barrel portion as it proceeds through the tunnel-like heating member 57, so that a quaternary article 58 is formed (FIG. 10(D)).

Next, described below is a polyester bottle of the present invention. Referring to FIG. 11 (side sectional view) and FIG. 12 (bottom view) for explaining the structure of this bottle, the bottle 61 comprises a neck portion 62, a cylindrical lower barrel portion 64 connected to the neck portion via an upper barrel portion 63 of the shape of a truncated cone or a body of revolution, and a bottom portion 65 connected to the lower end of the lower barrel portion. In the neck portion 62 are formed a threaded portion 66 for fastening the cap and a support ring 57. Between the lower barrel portion 64 and the upper barrel portion 63 is formed a recessed bead portion 68 which produces buffer action at the time of heating and cooling, and between the lower barrel portion 64 and the bottom portion 65 is formed a stepped portion 59 that produces buffer action at the time of heating and cooling.

In the lower barrel portion 64 are formed panel portions 70 of nearly an elongated shape and rib portions 71 that work as a frame for the panel portions being arranged in the circumferential direction, thereby to form a mechanism for symmetrical panel-sinking stability in the vacuum pressure. That is, the panel portions 70 undergo paneling deformation to retract inwardly thereby to prevent poor-looking deformation of the bottle in the vacuum pressure.

The bottom portion 65 comprises a central portion 72 of bottom and a peripheral grounding portion 73 that outwardly extends in the axial direction from the central portion of bottom. In this embodiment, the bottom portion 65 comprises the ring-like peripheral grounding portion 73 and the central portion 72 of bottom that is inwardly recessed like a dome. The central portion 72 of bottom is upwardly recessed by a height H beyond the peripheral grounding portion 73. As far as this height is maintained, the self-standing stability of the bottle is maintained.

In the heat-resistant polyester bottle of the present invention, it is desired that the thickness of barrel portion of the bottle is generally from 200 to 500 μm and, particularly, from 250 to 450 μm and the weight is from 25 to 38 g/l and, particularly, from 28 to 35 g/l, through they may differ depending upon the volume and application of the bottle. The weight is decreased by more than 5% compared with the conventional bottles.

The heat-resistant polyester bottle of the present invention can be effectively used for such applications as containing hot liquid contents, and are utilizable as containers for containing and preserving a variety of beverages and liquid seasonings. The suitable temperature for hot-containing will be from 50° to 110° C.

EXAMPLES

The invention will be further described by way of the following Examples.

In Examples and Comparative Examples, properties of the container were evaluated and measured as described below.
(I) Thickness.
Thickness of the sample was measured by using a micrometer (having a ball of 2.38 mm in diameter).
(II) Crystallinity.
An n-heptane/carbon tetrachloride density-gradient tube (manufactured by Ikeda Rika Co.) was prepared, and the density of the sample was found under the condition of 20° C. The crystallinity was calculated in compliance with the following relation, $$\text{Crystallinity } Xc = \frac{\rho c}{\rho} \cdot \frac{(\rho - \rho am)}{(\rho c - \rho am)} \times 100 \tag{1}$$

ρ: measured density (g/cm$^3$)
ρam: amorphous density (1.335 g/cm$^3$)
ρc: crystalline density (1.455 g/cm$^3$)
(III) Birefringence.
Retardation R was measured by using a polarized microscope, Model S, (using a direct read-type Babinet compensator, manufactured by Nikon Co.).
Birefringence was calculated from the following relation.

$$\text{Birefringence } \Delta n = R/d \text{ (d: thickness)} \tag{2}$$

To measure the retardation, the sample was sliced by using a microtome (manufactured by Reichert-Jung) maintaining a thickness of 10 μm such that the gross section was in the circumferential direction and in the thickness direction of the bottle.
(IV) Falling test.
A bottle was filled with the water up to 40 mm below the end of mouth of the bottle. The bottle filled with the water was allowed to fall vertically on the concrete floor five times at room temperature from the height of 1.2 m. When the bottle was cracked before five times, the vertical fall up to that number of times was recorded. The bottles produced under the same conditions were tested with n=3.
(V) Heat resistance test.
A mark was attached at a height of 30 mm above the bottom portion of the bottle, and the water was introduced up to the mark to measure the volume $V_0$. The water was then drained and the water heated at 85° C. was introduced up to 40 mm below the end of the mouth of the bottle. After fitted with the cap, the bottle was left to stand in a lying state for one minute and then in an erected state for four minutes. After cooled with the water of a normal temperature, the water contained therein was drained. Then, the water was introduced again up to the marked position to measure the volume V1. By using these values, a volume shrinking factor $V' = (V_0 - V_1)/V_0 \times 100$ (%) in the bottom portion and in the vicinity thereof was calculated.

Example 1

A preform article having bottom weighing 49 g was obtained by injection-molding a polyethylene terephthalate resin (J125TKL having an intrinsic viscosity of 0.78 dl/g and a DEG copolymerization degree of 1.3% by weight, manufactured by Mitsui PET Resin Co.). The mouth portion and an area of a radius of not larger than 8 mm at the center of the bottom were heat-treated and crystallized so as to be whitened. The preform article was heated by an infrared heater and was subjected to the stretch-blow molding while being sandwiched between a stretch rod and a press rod using a metal mold for primary blow molding (having bottom shape of bottle corresponding to that of FIG. 8). The article was then passed in a revolving manner through a tunnel-like infrared heating member so as to be heat-shrunk, and was then subjected to the stretch-blow molding using a metal mold (metal mold for secondary blow molding heated at 70° C.) equipped with a cavity corresponding to FIGS. 11 and 12, to obtain a self-standing one-piece bottle having a content of about 1.5 liters (FIG. 11). The temperature of the preform article was measured at a central position in the direction of height and the temperature for heating the bottle was measured at a central portion of the barrel and at a peripheral portion of bottom of the bottle of when it has come out from the tunnel-like heating member but just before the metal mold is closed by using an infrared radiation thermometer. By changing these temperatures, there were obtained bottles A and B. The tunnel-like infrared heating member controled to heat the bottom portion first and to heat the bottom and the barrel next in bottle A. But it controled to heat the bottom and the barrel simultaneously in bottle B.

Example 2

A preform article was obtained in the same manner as in Example 1, and the mouth portion only was crystallized. The preform article was then heated by using an infrared heater and was subjected to the draw-blow molding (free blow molding) by using a stretch in a state where the mouth portion only was secured but the outer periphery and the bottom portion were not locked. The article was then inserted in a cylindrical infrared heating member and was heat-shrunik, and was then subjected to the stretch-blow molding using the metal mold for secondary blow molding of Example 1 to obtain a bottle having a shape shown in FIG. 11. By changing the molding temperature, there were obtained bottles C and D.

Comparative Example 1

A preform article weighing 59 g was obtained and was heated in the same manner as in Example 1. Next, the preform article was subjected to the stretch-blow molding using a metal mold for blow molding and a stretch rod to prepare a bottle same as the one shown in FIG. 11. A bottle E was the one that was obtained by using a metal mold heated at 140° C. at the barrel portion and at 70° C. at the bottom portion, and a bottle F was the one that was obtained by using a metal mold heated at 160° C. both at the barrel portion and the bottom portion.

In the bottom portions of these bottles, the positions separated away from the center of the bottom by 5 mm, 15 mm, 25 mm and 35 mm were denoted as a, b, c and d. As for the barrel portion of the bottle, the central portion in the direction of height (position 150 mm away from the end of the mouth) was denoted as e, the central portion of the panel was denoted as f (FIG. 11), and thicknesses and crystallinities of these portions were measured. As for the portion f, the sample was divided into an inner half and an outer half to take measurement. The results were as shown in Table 1. As for the bottles A and B, however, the portion a was an undrawn, whitened and crystallized portion (thick portion at the center) which was not covered in the scope of claim of the present application, and was not measured. The birefringence Δn was measured at the portion b for the bottles A and B, and was measured at the portion a for other bottles. Since the birefringence may vary in the direction of thickness, it was measured nearly at the center of the thickness.

The falling test was carried out with n=3. An open circle ○ represents the case of when none of the three bottles was cracked, Δ represents the case of when two of them were not cracked, and X represents the case of when two or more of them were cracked. The results were as shown in Table 2.

Table 2 also shows the results of heat resistance testing, thickness ratio of the bottom portion and the central portion of barrel, as well as crystallinity ratios culculated from Table 1.

As will be obvious from Tables 1 and 2, the one-piece type heat resistant polyester bottles covered by the scope of claim of the present application were bottles A, C and D. These bottles possessed a thickness of not larger than 0.6 mm in the bottom portion except the thick central portion of bottom and in the center of the barrel, possessed a birefringence in (the circumferential direction—the thickness direction) of not smaller than 0.070, and exhibited a crystallinity of not smaller than 35%, thus being drawn to a sufficient degree. Therefore, a high strength and a high heat resistance could be expected. In the falling test in practice, the bottles were not cracked at all and exhibited a small volume shrinking factor in the heat resistance testing.

In the case of the bottle B, the portion b was not thinner than 0.6 mm and was drawn little and was heated at a temperature which was lowered by the amount of thickness (the smaller the thickness, the higher the temperature as heated by the infrared heating member) and, hence, exhibited a small crystallinity and a small birefringence. The portion d exhibited a crystallinity of as small as 27.1%. The temperature at the bottom portion was 145° C. as measured by the infrared radiation thermometer, from which it was difficult to consider that the bottom portion was heated at a temperature which was very lower than 145° C. though the measuring position was slightly different. Therefore, the bottle was taken out just before it was subjected to the secondary blow molding, i.e., after it was heat-shrunk in order to measure the crystallinity and thickness of a portion corresponding to the bottom portion d to be 39.5% and 515 μm. It was therefore considered that the portion d wasredrawn at a very large rate through the secondary blow molding and has lost crystallinity to a great degree. The fact that the crystallinity has changed to a large degree means that the polymer structure has changed. In this case, the thickness was reduced from 515 μm to 102 μm, and the shape of bottom of the bottle after heated became considerably different from the shape of bottom of the final bottle shown in FIG. 11 because of a considerably large processing rate. Therefore, though processed under high temperature conditions, it is considered that the bottom portion was severely drawn destroying the polymer structure through the heating and leaving residual strain. Because of these reasons, the bottle B possessed poor heat resistance and cracked at an extremely thin portion when it was fallen. In the heat resistance testing, the bottles E and F exhibited large volume shrinking factors V' at the bottom portion and in the vicinity thereof. In the case of the bottle E, the central portion of bottom was drawn to a small degree and was not crystallized. Besides, the metal mold was heated at a temperature of as low as 70° C. at the bottom portion thereof. It is therefore considered that the bottom portion was not heat-set and exhibited a large volume shrinking factor through the heat resistance testing. In the case of the bottle F, the bottom portion was more drawn than that of the bottle E but was still considerably thick and was drawn to a small degree. Besides, the bottle F was thinly whitened. This was presumably because the metal mold was heated at a temperature of as high as 160° C. and spherulite crystals have grown in the lowly-stretch portions due to crystallization by heating. Therefore, the resistance against the falling impact was poor. The panel portions of the bottles A, B, C and D exhibited crystallinities that were larger on the inner side than on the outer side. On the other hand, the panel portions of the bottles E and F exhibited crystallinities that were smaller on the inner side than on the outer side. Bottles of a number of 100 were subjected to the heat resistance testing (V) that was mentioned above. The bottles A, B, C, D, E and F developed asymmetrical deformation of the pannels at frequencies of 0/100, 0/100, 0/100, 0/100, 18/100 and 7/100.

TABLE 1

| | Temp. of perform (°C.) | Temp. of heating bottle Bottom (°C.) | Temp. of heating bottle Barrel (°C.) | Thickness (μm) a | b | c | d | e | Crystallinity (%) a | b | c | d | e | f out-side | f in-side |
|---|---|---|---|---|---|---|---|---|---|---|---|---|---|---|---|
| A | 107 | 174 | 150 | — | 469 | 359 | 240 | 322 | — | 43.2 | 42.6 | 41.1 | 38.8 | 38.2 | 39.1 |
| B | 104 | 145 | 140 | — | 628 | 302 | 102 | 365 | — | 32.5 | 38.6 | 27.1 | 36.4 | 36.1 | 36.9 |
| C | 105 | 192 | 200 | 460 | 402 | 305 | 286 | 420 | 49.7 | 46.6 | 44.3 | 42.5 | 52.1 | 51.7 | 52.6 |
| D | 100 | 180 | 172 | 442 | 431 | 385 | 330 | 431 | 46.5 | 44.9 | 41.3 | 37.6 | 44.3 | 42.3 | 43.3 |
| E | 107 | — | — | 3010 | 3270 | 1730 | 387 | 320 | 0 | 0 | 7.7 | 28.1 | 35.7 | 36.0 | 35.3 |
| F | 102 | — | — | 1980 | 1100 | 1380 | 420 | 380 | 17.1 | 22.7 | 17.9 | 24 | 40.8 | 41.5 | 40.0 |

TABLE 2

| | Thickness of bottom/ thickness of central portion of barrel | | | | crystallinity of bottom/ crystallinity of central portion of barrel | | | | Birefringence | Falling | Heat-resistance test Vol. shrimking |
|---|---|---|---|---|---|---|---|---|---|---|---|
| | a | b | c | d | a | b | c | d | Δn | test | factor V (%) |
| A | — | 1.46 | 1.11 | 0.75 | — | 1.11 | 1.10 | 1.06 | 0.093 | ○ | 0.94 |
| B | — | 1.72 | 0.83 | 0.28 | — | 0.89 | 1.06 | 0.74 | 0.0494 | Δ | 6.2 |
| C | 1.10 | 0.96 | 0.73 | 0.68 | 0.95 | 0.89 | 0.85 | 0.82 | 0.121 | ○ | 0.68 |
| D | 1.03 | 1.00 | 0.89 | 0.77 | 1.05 | 1.01 | 0.93 | 0.85 | 0.103 | ○ | 1.1 |
| E | 9.41 | 10.22 | 5.41 | 1.21 | 0 | 0 | 0.22 | 0.79 | 0.005 | Δ | 4.2 |
| F | 5.21 | 2.89 | 3.63 | 1.11 | 0.42 | 0.56 | 0.44 | 0.59 | 0.019 | X | 3.0 |

○: good, Δ: fair, X: bad

Example 3

By using an apparatus of FIG. 5, a heat-resistant polyethylene terephthalate (PET) bottle shown in FIG. 11 which is a finally article was prepared having an outer diameter of 94 mm, an overall height of 305 mm (height of heating portion of 280 mm), a capacity of 1500 ml and a recessed bottom portion.

A predetermined preform article was heated at 100° C., and was subjected to the primary blow molding using a metal mold as shown in FIG. 7(A) maintained at 70° C. to obtain a secondary article having a recessed portion of 3 mm deep at the center of the bottom portion and a domed bottom portion of a relatively uniform thickness. The secondary article was allowed to pass in a revolving manner over a period of eight seconds through a tunnel-like infrared heating member which was divided into three zones along the circumference to possess surface temperatures of from 500° to 700° C. in order to obtain a quaternary article having a bottom portion which was shrunk nearly flatly, having a barrel portion which was shrunk in the direction of height and in the direction of diameter, and being finally heated at the barrel portion and at the bottom portion both at a temperature of about 180° C. The quaternary article was subjected to the secondary blow molding to obtain a final product. The final product was filled with the hot water heated at 95° C. and was evaluated for its heat resistance (favorable range: change of volume is not larger than 2%) relying upon a change in the volume. Favorable results were obtained.

We claim:

1. A method of producing a biaxially-stretch-blow-molded container by blow-molding a cylindrical preform article with bottom that is heated at a drawing temperature, comprising:

a step for subjecting the preform article to a primary blow molding to obtain a biaxially drawn secondary article having a domed bottom portion without substantially containing undrawn portions;

a step for heating the domed bottom portion of the secondary article to preferentially shrink the bottom portion in order to obtain a tertiary article having a flat bottom portion;

a step for heating the tertiary article inclusive of the bottom portion and a barrel portion thereof in order to obtain a quaternary article of which the barrel portion is chiefly shrunk; and a step for subjecting the heated quaternary article to a secondary blow molding.

2. A method of producing a biaxially-stretch-blow-molded container by blow-molding a cylindrical preform article with bottom that is heated at a drawing temperature, comprising:

a step for subjecting the preform article to a primary blow molding to obtain a biaxially drawn secondary article having a domed bottom portion with an undrawn thick portion at the center of the bottom, the thick portion being slightly recessed inwardly of the container from the lowest portion of the bottom;

a step for heating the domed bottom portion of the secondary article to increase the degree of recess of the thick portion by preferentially shrinking the bottom portion in order to obtain a tertiary article having a bottom portion where the periphery of the thick portion is flattened;

a step for heating the tertiary article inclusive of the bottom portion and a barrel portion thereof in order to obtain a quaternary article of which the barrel portion is chiefly shrunk; and a step for subjecting the heated quaternary article to a secondary blow molding.

3. A method of producing a biaxially-stretch-blow-molded container according to claim 2, wherein in the step of obtaining the tertiary article from the secondary article, the domed bottom portion of the secondary article is heated and is preferentially shrunk while pushing the thick portion at the center of the bottom of the secondary article in order to increase the degree of recess of the thick portion, thereby to obtain the tertiary article having a bottom portion where the periphery of the thick portion is flattened.

4. A method of producing a biaxially-stretch-blow-molded container according to any one of claims 1 to 3, wherein the drawing in the primary blow molding is effected under the condition where at least the outer periphery and the bottom portion of the preform article undergo tree blowing to form the secondary article.

* * * * *